United States Patent [19]

Bayat

[11] Patent Number: 4,791,948

[45] Date of Patent: Dec. 20, 1988

[54] SPRINKLER CONTROL SYSTEM

[76] Inventor: John J. Bayat, 3501 Cashill Blvd., Reno, Nev. 89509

[21] Appl. No.: 159,728

[22] Filed: Feb. 24, 1988

Related U.S. Application Data

[63] Continuation-in-part of Ser. No. 124,722, Nov. 24, 1987, which is a continuation-in-part of Ser. No. 849,470, Apr. 8, 1986, Pat. No. 4,708,162.

[51] Int. Cl.$^4$ .............................................. A01G 27/00
[52] U.S. Cl. ................... 137/1; 137/624.18; 239/70; 239/69
[58] Field of Search ............ 137/624.18, 624.2, 1, 137/883; 239/70, 69

[56] References Cited

U.S. PATENT DOCUMENTS

| | | | |
|---|---|---|---|
| 3,286,733 | 11/1966 | Hunter | 137/624.2 |
| 3,386,460 | 6/1968 | Dean | 137/624.18 X |
| 4,548,225 | 10/1985 | Busalacchi | 137/624.11 X |

Primary Examiner—Alan Cohan
Attorney, Agent, or Firm—Flehr, Hohbach, Test, Albritton & Herbert

[57] ABSTRACT

Self-contained, automated flow control system for use in a water distribution system such as a sprinkler system. The system has a master valve which controls communication between a supply line and a manifold, and a plurality of control valves which control communication between the manifold and a plurality of outlet lines. An anti-siphon valve is connected between the master valve and the control valves to prevent water from being drawn back into the supply line from the outlet lines. Operation of the master valve and control valves is controlled by a clock timer which is programmed to actuate the valves in a predetermined sequence and, in some embodiments, to open the master valve after one of the control valves is opened and to close the master valve before the control valve is closed.

3 Claims, 3 Drawing Sheets

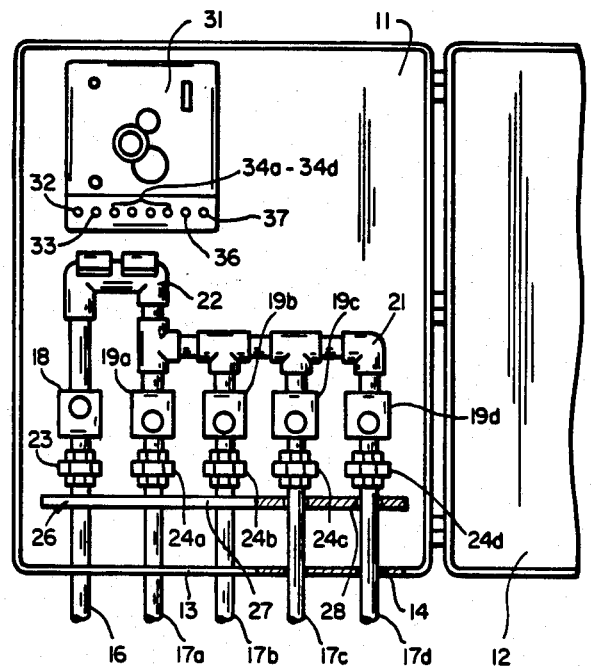
FIG_1
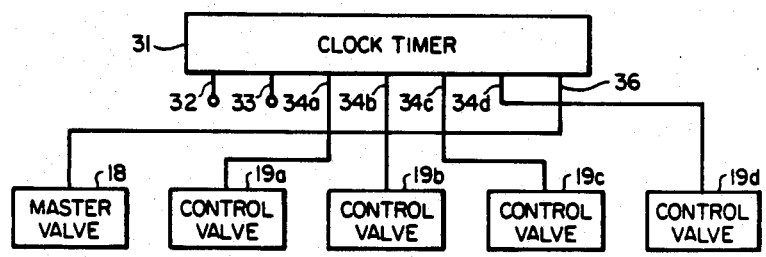
FIG_2

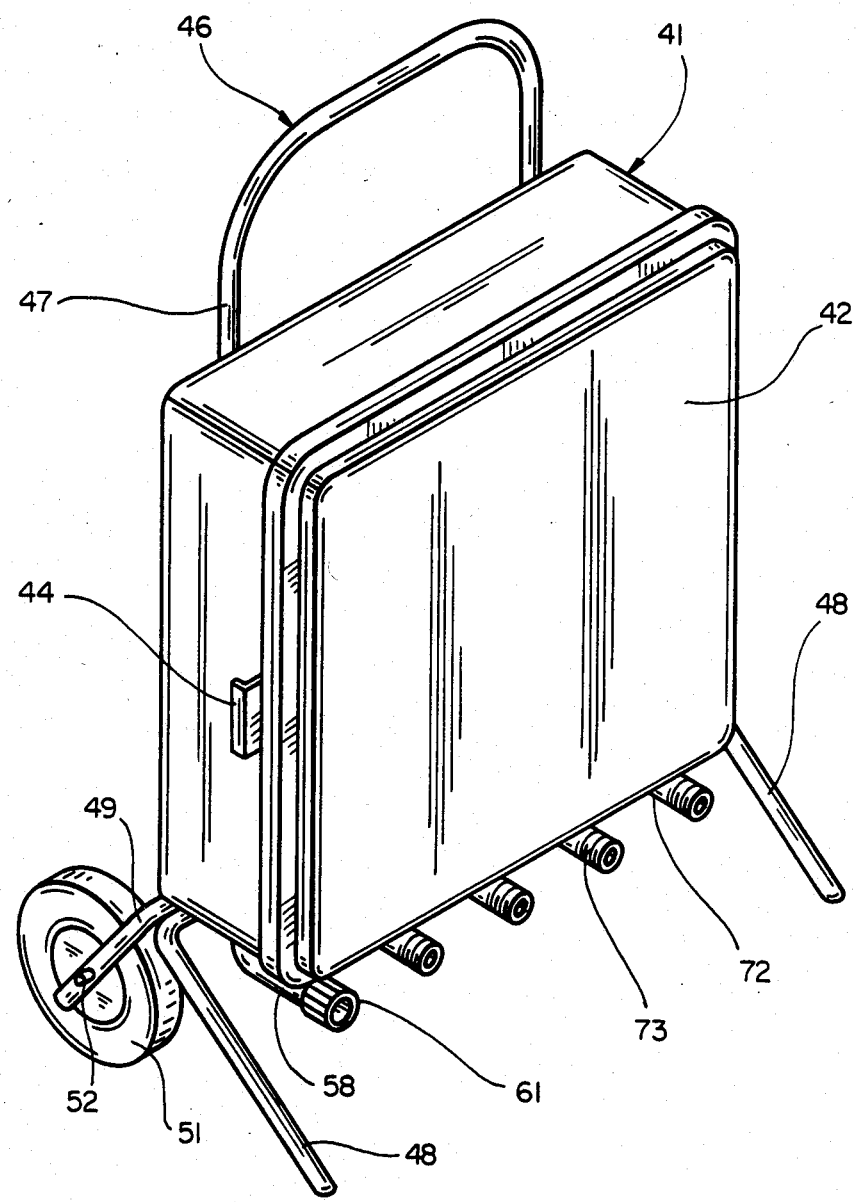
FIG_3

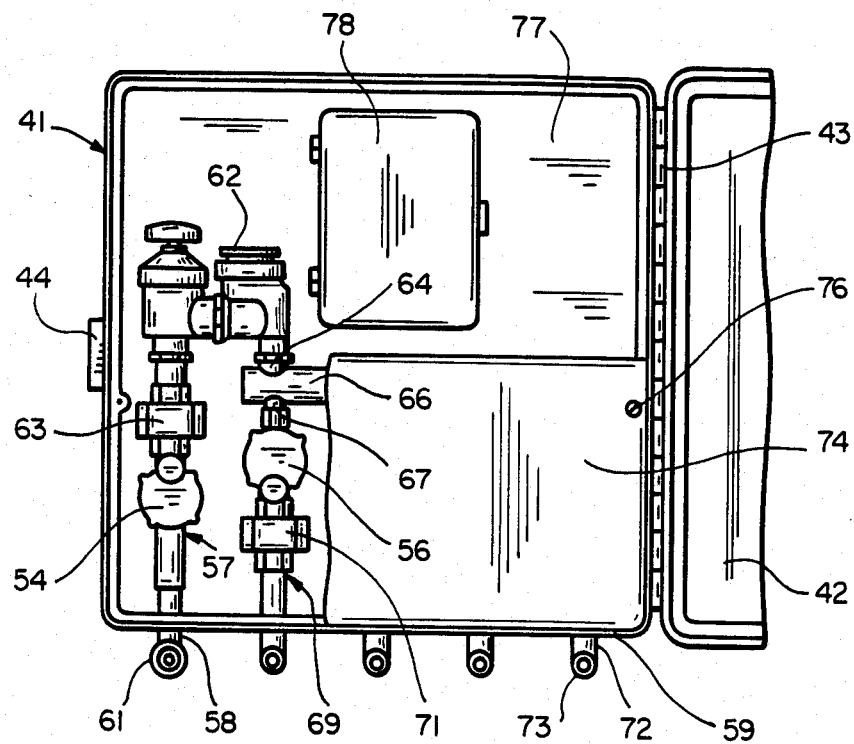
FIG_4
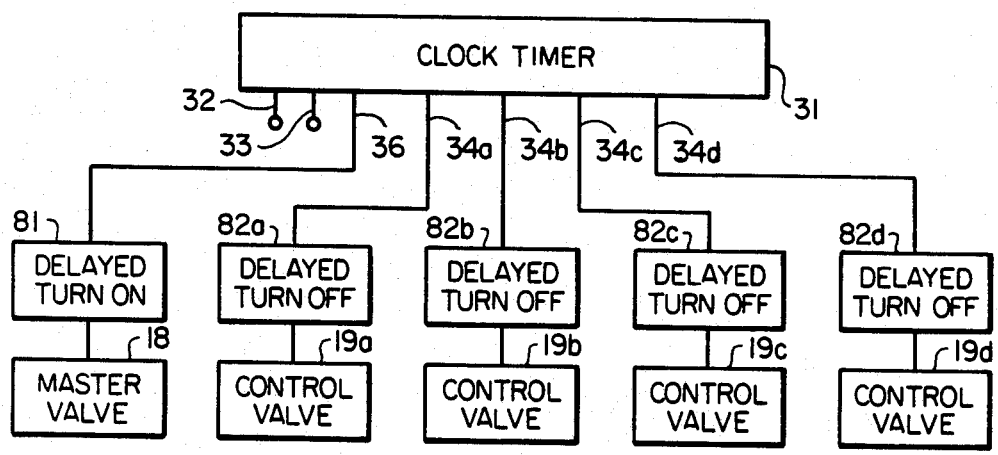
FIG_5

SPRINKLER CONTROL SYSTEM

This is a continuation-in-part of Ser. No. 124,722 filed Nov. 24, 1987, which is a continuation-in-part of Ser. No. 849,470, filed April 8, 1986, now U.S. Pat. No. 4,708,162.

This invention pertains generally to water distribution systems such as sprinkler systems, and more particularly to an automated flow control system which is particularly suitable for use in a sprinkler system.

It is in general an object of the invention to provide a new and improved automated control system for sprinklers and other water distribution systems.

Another object of the invention is to provide a system of the above character which is economical to manufacture and easy to install and maintain.

These and other objects are achieved in accordance with the invention by providing a flow control system having a manifold, a master valve which controls communication between a supply line and the manifold, a plurality of control valves which control communication between the manifold and a plurality of outlet lines, an anti-siphon valve between the control valves and the master valve, and a clock timer for actuating the valves in a predetermined manner. In some of the disclosed embodiments, the master valve is opened after one of the control valves is opened and is closed before the control valve is closed. This system is constructed as a self-contained unit in a protective cabinet, and union connectors permit the supply and outlet lines to be readily connected to and disconnected from the unit.

FIG. 1 is a somewhat schematic front elevational view, partly broken away, of one embodiment of a flow control system according to the invention.

FIG. 2 is a circuit diagram of the flow control system of FIG. 1.

FIG. 3 is an isometric view of a second embodiment of a flow control system according to the invention.

FIG. 4 is a front elevational view, partly broken away, of a portion o the embodiment of FIG. 3 with the cabinet door in an open position.

FIG. 5 is a circuit diagram of an embodiment of the control system which includes time delay switches for opening the master valve after the control valves are opened and closing the master valve before the control valves are closed.

As illustrated in FIG. 1, the flow control system includes a generally rectangular cabinet 11 having a hingedly mounted front cover 12. The bottom wall 13 of the cabinet has a plurality of circular openings 14 through which a supply line 16 and a plurality of outlet lines 17a–17d extend. Although a single supply line and four outlet lines are shown in this particular example, any desired number of lines can be employed, and the cabinet can be sized accordingly. Within the cabinet, a master valve 18 and control valves 19a–19d control flow between the supply lines and the outlet lines. The master valve is connected between the supply line and the inlet port of a manifold 21, and the control valves are connected between the outlet ports of the manifold and the outlet lines. Each of these valves is an electrically actuated, normally closed, solenoid operated valve. An anti-siphon valve 22 is connected between the main valve and the inlet port of the manifold to prevent backflow from the outlet lines to the supply line.

Connections between the supply line and the master valve and between the outlet lines and the control valves are made with union fittings 23 and 24a–24d, respectively. These fittings permit the valves and manifold to be readily installed and removed without rotating or otherwise disturbing the supply and outlet lines.

The manifold and valves are secured in the cabinet by a mounting rack 26 which extends horizontally across the cabinet above bottom wall 13 and below unions 23 and 24a–24d. The rack comprises a bar 27 of rigid material which is affixed to the rear wall of the cabinet and has spaced apart openings 28 through which the supply and outlet lines extend. These openings are of smaller diameter than the unions, and the portions of the unions connected to the supply and outlet lines engage the rack to hold the lines when the manifold and valves are disconnected. The rack also permits limited up and down movement of the lines as they are connected and disconnected.

Operation of valves 18 and 19a–19d is controlled by a programmable clock timer 31 which is mounted in cabinet This timer is of conventional design and it has input terminals 32, 33 for connection to a power source, output terminals 34a–34d and 36, and a common or ground terminal 37. Terminals 34a34d are energized sequentially in accordance with the programming of the timer, and terminal 36 is energized whenever one of the other output terminals is energized. Terminals 34a34d are connected to control valves 19a–19d, respectively, and terminal 36 is connected to master valve 18. The master valve is energized or opened only when one of the control valves is open, and pressure is removed from the anti-siphon valve 22 when all of the control valves are closed.

Operation and use of the flow control system in connection with a sprinkler system is as follows. The control system is mounted in a suitable location such as the outside wall of a house or other building. Supply line 16 is connected to a pressurized water source, and outlet lines 17a–17d are connected to the feeders for the different sections of the sprinkler system. Input terminals 32, 33 of clock timer 31 are connected to a power source, and the timer is programmed to energize or open control valves 19a–19d in a predetermined sequence. Whenever one of the control valves is opened, the master valve is also opened, and water is delivered to the sprinkler section connected to that valve. Anti-siphon valve 22 prevents water from being drawn back into the supply line from the outlet lines, and pressure is removed from the anti-siphon valve when all of the control valves are closed.

The supply and outlet lines can be any suitable material, such as a plastic pipe or garden hose, and they can be provided with fittings for connection to other lines. Thus, for example, the supply line might be a pipe which is connected permanently to the water supply system, and the outlet lines might comprise pipe nipples with male hose fittings positioned outside the cabinet for connection to a plurality of hoses. Alternatively, the outlet lines might be pipes connected permanently to a sprinkler system. Any desired combination of hoses and pipes or other lines is possible.

The embodiment illustrated in FIGS. 3 and 4 is a portable unit which is particularly suitable for use with garden hoses. This embodiment includes a generally rectangular cabinet 41 with a front cover 42. The cover is mounted on the cabinet by a hinge 43 which extends along one side edge of the cabinet, with a latch 44 for securing the cover in its closed position.

Cabinet 41 is mounted on a hand cart 46 which has a U-shaped frame 47, with U-shaped legs 48, 49 extending forwardly and rearwardly from the lower end of the frame. Wheels 51 are rotatively mounted on an axle 52 which extends between the lower end portions of rear legs 49. In the embodiment illustrated, the frame and legs are each fabricated of a rigid tubular material, and the central sections of the U-shaped legs are affixed to the lower portions of the frame by suitable means such as welding. The cabinet can be secured to the frame by any suitable means such as screws or clamps (not shown). The lengths of the legs are such that the frame and cabinet are maintained in an upright position when wheels 51 and the lower ends of front legs 48 are resting on a level surface.

A master valve 54 and plurality of control valves 56 are mounted within cabinet 41. These valves are electrically actuated, normally closed, solenoid operated valves similar to valves 118 and 19a–19d in the embodiment of FIG. 1 supply line 57 is connected to the inlet side of master valve 54. The supply line includes an elbow 58 which extends through an opening in the bottom wall 59 and has a female hose fitting 61 at the lower or front end thereof.

The outlet side of master valve 54 is connected to the inlet of an anti-siphon valve 62 by a union fitting 63. As in the embodiment of FIG. 1, the anti-siphon valve prevents backflow from the system into the supply line.

The outlet of anti-siphon valve 62 is connected to the inlet port 64 of a manifold 66. The manifold has a horizontally extending tubular body and a plurality of outlet ports 67 which are connected to the inlet sides of control valves 56. In this embodiment, manifold 66 is preferably fabricated as a unitary structure by injection molding.

The outlet sides of control valves 56 are connected to outlet lines 69 by union fittings 71. The outlet lines include elbows 72 which pass through openings in the bottom wall 59 of the housing, wit male hose fittings 73 at the outer ends of the elbows.

Master valve 54, control valves 56, and manifold 66 are mounted in the lower portion of housing 41 and covered by a removable panel 74. This panel is secured to the housing by mounting screws 76 and has a horizontally extending upper wall or flange with rearwardly facing openings (not shown) through which the inlet and outlet fittings of the anti-siphon valve can pass during installation and removal of the panel. Manifold 66 is secured to the rear wall 77 of the housing by suitable means such as clamps and screws (not shown).

A programmable clock timer 78 similar to clock timer 31 is mounted in the upper portion of the housing. This clock timer is connected to valve 54, 56 in the same manner that clock timer 31 is connected to valves 18, 19a–19d, and the electrical connections are omitted from the drawings for ease of illustration.

Operation and use of the embodiment of FIGS. 3-4 is as follows. The system is rolled to a desired location on wheels 51 and stood in an upright position, as illustrated. The unit is relatively light in weight, and if desired, it can be lifted and carried about.

A supply hose is connected to the female hose fitting 61 on the supply line, and garden hoses can be connected to the male hose fittings 73 on the outlet lines. As in the embodiment of FIG. 1, whenever one of the control valves is open, the master valve is also open, and water is delivered to the hose connected to that valve. Anti-siphon valve 62 prevents water from being drawn back into the supply line from the outlet lines, and pressure is removed from the anti-siphon valve when all of the control valves are closed.

If desired, anti-siphon valve 62, manifold 66 and control valves 56 can be removed from the cabinet as a unit by disconnecting union fittings 63, 71 with master valve 54 in its closed position. With the master valve positioned upstream of union 63 in the supply line, there is no need to turn off the water supply to the master valve.

In both of the embodiments described above, it has been found to be desirable to open the master valve only after one of the control valves has been opened and to close the master valve before the control valve is closed. Delaying the opening of the master valve in this manner prevents water surge which might otherwise damage the anti-siphon valve or the manifold to which the control valves are connected. Keeping the control valves open after the master valve has been closed relieves the water pressure in the anti-siphon valve and in the manifold and allows the water to drain out of the manifold.

As illustrated in FIG. 5, the delayed opening of the master valve and the delayed closing of the individual control valves can be effected by time delay switches connected between the output terminals of the clock timer and the respective valves. Except for the addition of the time delay switches, this circuit is similar to the circuit of FIG. 2, and like reference numerals designate corresponding elements in the two figures.

It will be recalled that output terminals 34a–34d are energized sequentially in accordance with the programming of clock timer 31 and that output terminal 36 is energized whenever one of the other output terminals is energized. A time delay device 81 is connected between output terminal 36 and master valve 18 to delay the opening of the master valve for a predetermined time, e.g. a few seconds, after output terminal 36 is energized. Time delay devices 82a–82d are connected between output terminals 34a–34d and to control valves 19a–19d, respectively, to delay the closing of the control valves for a predetermined time, e.g. a few seconds, after the output terminals are de-energized. The delay devices can be any suitable devices of known design such as timer delay circuits, time delay switches, or time delay relays. The delay devices can also be built into the clock timer, if desired.

Instead of utilizing electrical or electronic time delay devices, the desired time delays can be effected mechanically or hydraulically within the valves themselves or by separate mechanical or hydraulic delay devices. Such devices are known in the art.

Operation and use of the flow control system with the time delay circuits of FIG. 5 is as follows. Master valve 18 is connected to a pressurized water source, and control valves 19a–19d are connected via the outlet lines to the feeders for different sections of a sprinkler system. Input terminals 32, 33 of clock timer 31 are connected to a power source, and the timer is programmed to energize output terminals 34a–34d in a predetermined sequence. Whenever one of these output terminals is energized, output terminal 36 is also energized.

Upon energization of one of the output terminals 34a–34d, and output terminal 36, the control valve connected to the energized output terminal is opened immediately, but the opening of the master valve is delayed for the time determined by delay device 81. This prevents a water surge in the anti-siphon valve and the manifold which could damage them. When the output terminals are de-energized, the master valve closes immediately, but the closing of the control valve is delayed by the delay device 82a-82d connected to that valve. This relieves the pressure in the anti-siphon valve and in the manifold and permits the water to drain out of the manifold.

The invention has a number of important features and advantages. It is constructed as a self-contained unit which is economical to manufacture and easy to install and maintain. It can be employed in a wide variety of applications.

It is apparent from the foregoing that a new and improved flow control system has been provided. While only one presently preferred embodiment has been described in detail, as will be apparent to those familiar with the art, certain changes and modifications can be made without departing from the scope of the invention as defined by the following claims.

I claim:

1. In a sprinkler control system for controlling the delivery of pressurized water from a supply line to a plurality of outlet lines connected to individual sections of a sprinkler system: a manifold having an inlet port and a plurality of outlet ports, a main valve connected to he inlet port for delivery of pressurized water from the supply line to the manifold, a plurality of control valves connected to respective ones of the outlet ports for controlling the delivery of pressurized water from the manifold to the outlet lines, and means for sequentially operating the master valve and the control valves in such manner that the master valve is opened after a control valve is opened and is closed before the control valve is closed.

2. In a sprinkler control system for controlling the delivery of pressurized water from a supply line to a plurality of outlet lines: a master valve adapted to be connected to the supply line, a plurality of control valves connected to the master valve and adapted to be connected to respective ones of the outlet lines, and means for sequentially operating the master valve and the control valves in such manner that a control valve is opened before the master valve is opened and the master valve is closed before the control valve is closed.

3. In a method of controlling the distribution of pressurized water from a supply line to a plurality of outlet lines, the steps of: connecting a master valve to the supply line, connecting a plurality of control valves between the master valve and respective ones of the outlet lines, opening the control valve connected to one of the outlet lines, opening the master valve after the control valve has been opened, closing the master valve, and closing the control valve after the master valve has been closed.

* * * * *